United States Patent [19]
Itasaka

[11] 3,861,332
[45] Jan. 21, 1975

[54] INCINERATOR FOR UNSEGREGATED REFUSE

[75] Inventor: Tokio Itasaka, Higashikurume, Japan

[73] Assignee: Ebara Infilco Kabushiki Kaisha, Tokyo, Japan

[22] Filed: Nov. 26, 1973

[21] Appl. No.: 419,007

Related U.S. Application Data

[63] Continuation-in-part of Ser. No. 279,557, Aug. 10, 1972, abandoned.

[52] U.S. Cl. ................ 110/8 C, 110/13, 110/49 R
[51] Int. Cl. ............................................. F23g 5/12
[58] Field of Search ............ 110/8 R, 8 C, 13, 18 R, 110/18 C, 49 R

[56] References Cited
UNITED STATES PATENTS

| | | | |
|---|---|---|---|
| 2,213,668 | 9/1940 | Dundas et al. | 110/15 |
| 2,811,937 | 11/1957 | Bouchard | 110/49 |
| 3,344,758 | 10/1967 | Wotschke | 110/18 |
| 3,404,643 | 10/1968 | Ankerson | 110/13 |
| 3,641,952 | 2/1972 | Wotschte | 110/8 |
| 3,707,129 | 12/1972 | Kawashimo et al. | 110/8 |

*Primary Examiner*—Kenneth W. Sprague
*Attorney, Agent, or Firm*—Blum, Moscovitz, Friedman & Kaplan

[57] ABSTRACT

An incinerator is described which can process unsegregated refuse containing substantial quantities of organic constituents. In the incineration process the refuse is first dried and then subjected to heating in an atmosphere of low oxygen content to cause thermal cracking of the organic materials present in the refuse. The gases produced in the cracking are combustible. Part of the combustible gases is returned to a first burner in which heat is generated for bringing about the thermal cracking of the refuse. The remainder of the combustible gases is returned to a second incineration chamber in which any remaining organic matter is completely combusted and any non-combustible residue is reduced to cinder. A gasifying agent consisting of steam and air is injected to provide an atmosphere of low oxygen content.

14 Claims, 1 Drawing Figure

PATENTED JAN 21 1975  3,861,332
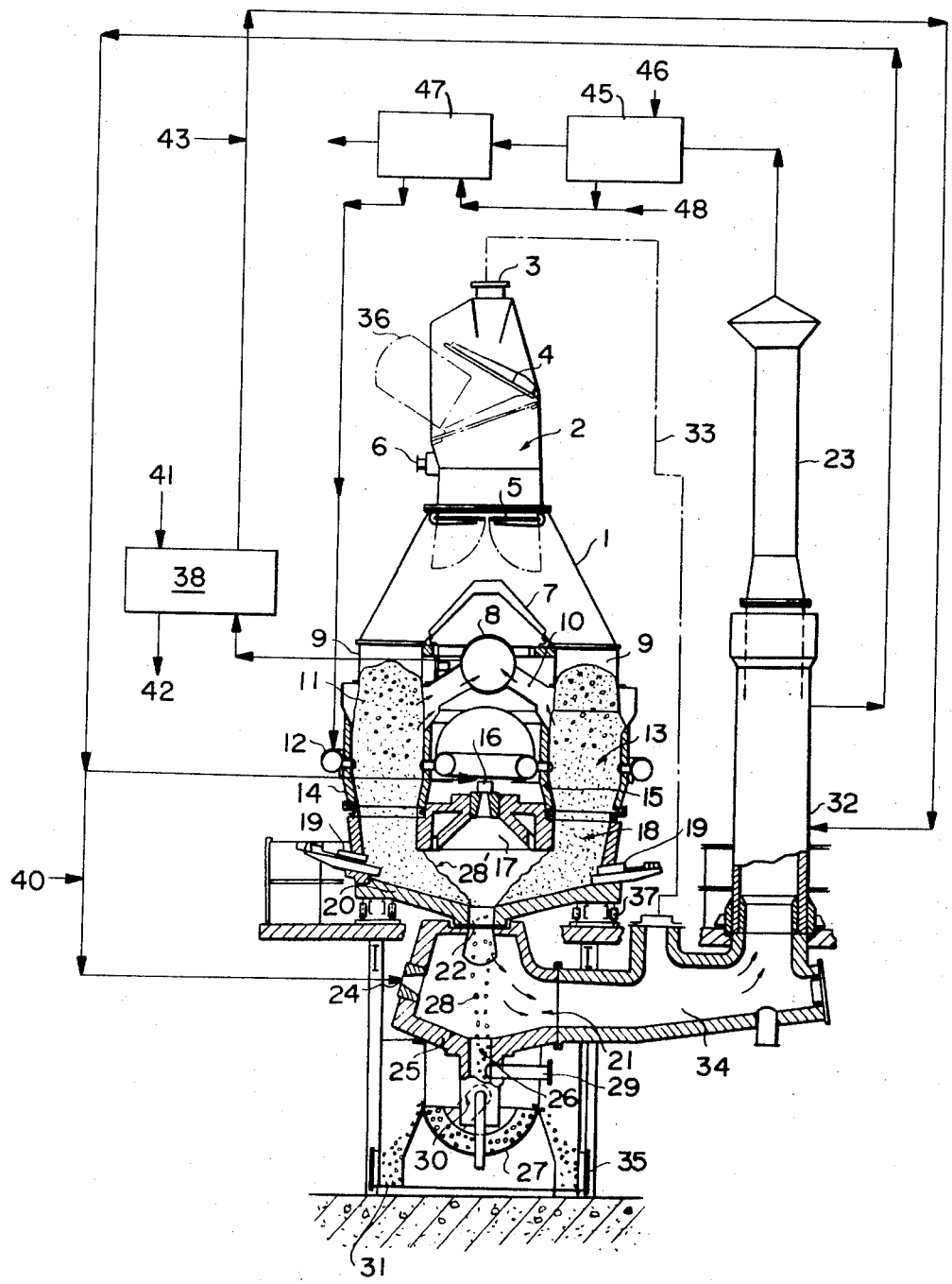

INCINERATOR FOR UNSEGREGATED REFUSE

CROSS REFERENCE TO RELATED APPLICATION

This application is a Continuation-In-Part of my co-pending application Ser. No. 279,557, filed Aug. 10, 1972, now abandoned.

BACKGROUND OF THE INVENTION

Refuse from inhabited areas and from various types of industrial facilities may vary widely in composition. The refuse may include, for instance, human and animal waste, garbage, plastic scrap, tires and other articles of rubber, scrap wood, oil-impregnated textiles and refuse oils, all of which are organic and essentially combustible. The refuse may also include scrap metal, scrap glass as well as inorganic compounds in the form of gravel, concrete debris, etc. The inflammable among these components range widely in heat of combustion from about 1200 kcal/kg up to about 7000 kcal/kg. Heretofore, it has been necessary to use a variety of types of disposal facilities for handling each type of material. Considering the cost of segregating the various types of material in accordance with the type of treatment necessary as well as the cost of the special facilities, and sites and the cost of operation, treatment of refuse by such a procedure is extremely expensive, and in some cases is prohibitively expensive.

It has not been possible to treat the types of materials listed above by ordinary combustion methods because such methods result in imperfect and imcomplete combustion. When such is the case, offensive odors are generated, the resultant product may be extremely corrosive, particularly at high temperature, and adherence of fly-ash to the equipment as well as to surroundings may cause great damage. In addition, it becomes necessary to handle substantial amounts of incompletely combusted components in the residual ash.

Disposal of ash also poses problems such as the scattering of ash dust by means of wind or by fouling of water. Moreover, provision must be made for preventing corrosion and damage to the combustion equipment and instruments and to preventing pollution of the environment such as is caused by the gases resulting from the combustion of chlorinated organic materials. The growing use of vinyl chloride resins and the resultant increase in the quality of scrap vinyl chloride resins is a particularly severe problem so far as corrosion of the equipment and attack on the environment are concerned.

Conventionally, during the course of incineration, gasification is carried out by injecting air and steam prior to incineration. The objective is to convert organic materials from different sources into forms which will burn uniformly in the manner of coal, wood or charcoal; however, refuse varies so widely in composition that the reaction velocity of gasification also varies strongly. Consequently, the difficulty in effecting complete combustion without damaging the environment has been such as to make the incineration operation uneconomical in many cases.

SUMMARY OF THE INVENTION

The apparatus of the present invention comprises in downward sequence a port near the top thereof through which refuse can be inserted, a rotary distributor, an annular drying chamber into the top of which refuse is uniformly distributed by the rotary distributor, a gas duct within the drying chamber which serves to lead out from the incinerator gases formed in lower zones, an annular dry distillation chamber for heat-cracking organic materials within the refuse to form combustible gases, pipes connecting the interior of the drying chamber with the gas duct, an annular oxidizing chamber below the dry distillation chamber, a duct for introducing steam and a limited quantity of air into said oxidizing chamber, a residue reservoir chamber below the oxidizing chamber, a downwardly directed burner located at the axis of the annulus which supplies hot gaseous combustion products from the drying chamber to the residue reservoir chamber, these gases bringing about partial melting of the residue within the chamber and then rising sequentially through the annular chambers above the reservoir chamber, the first stage of incineration taking place within the residue reservoir chamber and the oxidizing chamber, a second incinerator chamber below the residue reservoir chamber the two chambers being connected by a central port through which partially molten residue can drop into the incinerator chamber, a scraper for collecting the clinker formed in the incinerator chamber and ports at the bottom of the incinerator through which the clinker can be removed. The gaseous products of the second stage of incinerator pass through a heat exchanger in which heat is transferred to the fuel and air entering the incinerator and a chimney.

Gases rising from the drying chamber leave the incinerator through a port near the top thereof and are conducted to a conduit leading from the second incinerator chamber to the heat exchanger. The gases generated in the dry distillation chamber are conducted from the gas duct within the drying chamber to the downwardly directed first stage burner and to a burner in the second incinerator chamber, the gases while in transit, passing through the heat exchanger to retrieve the sensible heat which would otherwise be lost in the gases leaving the chimney.

Accordingly, an object of the present invention is to provide an improved apparatus for the complete incineration of mixed refuse without venting noxious or corrosive gases.

Yet another object of the present invention is an improved method of incinerating unsegregated refuse.

Another object of the present invention is to provide an apparatus having enhanced overall heat efficiency so that little or no extraneous fuel is needed for the operation thereof.

A further object of the present invention is to improve the efficiency and simplify the apparatus for and the process of incineration of mixed refuse, thereby reducing the initial cost, reducing the size and number of incinerators required and reducing the operational cost of incineration.

Still other objects and advantages of the invention will in part be obvious and will in part be apparent from the specification.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

BRIEF DESCRIPTION OF THE DRAWING

For a fuller understanding of the invention, reference is had to the following description taken in connection with the accompanying drawing, in which:

The single FIGURE is an elevational view in cross section of an embodiment according to the present invention.

DESCRIPTION OF THE PREFERRED EMBODIMENTS

In accordance with the present invention, in an incinerator 1 consisting of a steel or fire-proof material and having a gas exhaust pipe 3 in the top, there is provided an injecting chamber 2 for refuse at the top thereof, dampers 4 and 5 at the upper and lower parts of the injecting chamber 2, these dampers 4, 5 having an inlet pipe 6 for injection of inert gas connected therebetween. At the bottom of the injecting chamber 2 of the principle body 1, there are provided a rotary distributor 7 centered below the damper 5 and an annular drying chamber 9 surrounding gas duct 8. A gas collecting branch duct 10 extends from chamber 9 to duct 8. Further below the drying chamber 9, there is provided an annular dry distillation chamber 11 connected thereto for preheating, heat cracking and dry distilling the dried refuse which drops into chamber 11 from drying chamber 9. To the bottom of the dry distillation chamber 11, there is connected an annular oxidizing chamber 13, having a blow nozzle 12 for introduction of a gasifying agent. The gasifying agent consists of steam and air preheated sufficiently so that the steam will not condense. The quantity of air supplied is between one-third and one-fourth that necessary for complete combustion of the refuse and is adjusted in accordance with the composition of the refuse. The ratio of steam to air varies from 5:95 to 20:80 parts by volume. The annular oxidizing chamber 13 is formed of lower outer wall 14 and inner wall 15 which are respectively and individually rotatable using conventional bearings, seals and a motor (not shown).

A residue reservoir 18 communicates with the bottom of the oxidizing chamber 13, the residue reservoir including a flame chamber 17 having a downwardly directed burner 16 in the middle thereof. A pusher 19 is provided in the lower part of the chamber 18. A furnace bed 20 at the bottom of the chamber is rotatable and serves for the transfer of residue to discharge port 22.

The above described flame chamber 17 has a dome-like top portion which is fire-proof and water-cooled. The side wall of the flame chamber is protected by fire-proof material and the lower end is open towards the furnace bed 20, which is also of fire-proof construction. The furnace bed 20 is connected through central discharge port 22 to a secondary incinerating chamber 21 in the lower part of the furnace bed. Secondary incinerating chamber 21 is connected to a chimney 23 and has an auxiliary burner 24 in the inside thereof. Burners 16 and 24 are fed with exhaust gas from gas duct 8. For startup purposes, fuel from an extraneous source can be fed to burners 16 and 24 from line 40. Furnace bed 25 of the secondary incinerating chamber 21 communicates with a water cooled casing 27 through exhaust port 26.

In the drawing, numeral 28 denotes molten particles, 29 a vent gas pipe which is provided in the exhaust port 26 of the secondary incinerating chamber. 30 denotes a clinker scraper provided in water cooled casing 27; and 31 clinkers from which gas has been exhausted. Numeral 32 designates a fuel air preheater. 33 denotes a gas duct which is connected to the gas exhaust pipe 3 and to a smoke exhaust path 34 of the secondary incinerating chamber 21, 35 denotes a clinker takeout port, 36 a chute for injecting refuse, and 37 a roller bearing.

The exhaust gas from gas duct 8 is passed through purifier 38 in order to remove noxious gases such as HCl, $H_2S$ and HCN therefrom. A preferred method of removing such impurities is to contact said gas with an alkali such as CaO, NaOH or $Na_2CO_3$. These materials, in suspension, in large particle form or in solution may be introduced through conduit 41. The waste products are removed through waste line 42.

The refuse is intermittently injected into the chamber 2 by cranes or skip hoists. Before injecting the refuse, inert gas is introduced from conduit 6 for purging gas from the chamber between dampers 4 and 5. The purged gas is discharged from the exhaust pipe 3, taken through duct 33 to smoke exhaust path 34 and discharged through chimney 23. Then the damper 4 in the upper part of the injecting chamber is opened for injecting of refuse. After refuse is injected, the damper 4 is closed and the lower damper 5 is opened to introduce the refuse into the drying chamber 9. The refuse is evenly distributed by rotary distributor 7 within the annular drying chamber 9. The refuse is dried by the high temperature waste gas rising during downward movement of the refuse. The refuse then passes into the dry distillation chamber 11. Most of the gas used for drying passes through the gas collecting branch ducts 10 and is led off through the duct 8. The vented combustible gas is then purified by an outside gas purifier 38 and returned with air added through lines 43 for burning by burner 16 of flame chamber 17 and auxiliary burner 24 of the secondary incinerating chamber 21. Volatile components in the refuse in the dry distillation chamber 11 are distilled by high temperature inflammable waste gas which rises up from the oxidizing chamber 13 provided below.

The non-volatile residue reaches the oxidizing chamber 13 below and is rendered uniform by rotation of the outer wall 14 and inner wall 15. As aforenoted, a limited quantity of air together with steam are injected through blow nozzle 12 into oxidizing chamber 13. The $O_2$ in the air partially combusts the organic matter in the refuse. The temperature apparently rises sufficiently so that the injected steam reacts with carbon to give the reaction $$H_2O + C \rightarrow H_2 + CO$$

This is borne out by the fact that the gas leaving through duct 8 has little if any water therein; a sample composition is

| | |
|---|---|
| $H_2$ | 10.35% |
| $N_2$ | 58.92% |
| CO | 14.44% |
| $O_2$ | 1.02% |
| $CO_2$ | 11.39% |
| $CH_4$ | 3.47% |
| Others | 0.4% |

The values are all in weight percent. The heat of combustion of the gas is 1.16 kcal/l.

The residue from oxidizing chamber reaches the residue reservoir 18 where it is formed into a funnel-shape by means of side walls of the flame chamber 17, and is then raised to a high temperature by the burner 16 in the flame chamber 17. The surface of the residue melts and is formed into a thin film of non-flammable slag. The residue flows downwardly towards the central exhaust port 22 in the middle of the furnace bed 20. Any remaining residue, as it is pushed forward, is moved towards the molten thin film 28 by pusher 19 and by rotation of the furnace bed 20 to be later melted. The molten slag 28 falls from the exhaust port 22 through the secondary incinerating chamber 21 to which heat is supplied from the auxiliary burner 24 and the residue passes through the exhaust port 26. A part of the hot gas from chamber 21 passes out through pipe 29 thereby keeping port 22 hot. The molten residue falls into the water-cooled casing 27 through exhaust port 26. The resulting residue turns inot granular clinker 31 and is thereafter discharged and disposed of by a clinker scraper 30.

As the cracked residue reaches the secondary incinerating chamber 21 together with molten material 28, the incinerating exhaust gas burns completely in the secondary incinerating chamber 21. The gas separated from the molten material passes through the chimney air heat exchanger 32 and is discharged at a low temperature. The discharged gas contains virtually no corrosive gas or other noxious gas. The sensible heat in the discharged gas can be recovered in a boiler 45 to be used for steam generation from water entering from line 46, and can then be used to preheat in preheater 47 the steam and air entering at line 48 which will then be injected through blow nozzle 12.

The invention thus comprises the injecting chamber of refuse, an annular drying chamber, by annular dry distillation chamber and an oxidizing chamber in downward sequence, a port for injecting a gasifying agent into the oxidizing chamber, a residue reservoir having a flame chamber for melting the surface of the residue, a secondary incinerating chamber, a gas purifier, and a water cooled chamber, wherein various kinds of refuse are singly or unselectively disposed in a collective simultaneous way such that the generated inflammable gas, noxious gas, and combustible volatiles may be effectively utilized and thereby the amount of the exhaust gas may be decreased while the capacity of the incinerator is increased.

The apparatus of the invention thus can keep the temperature of generated gas low and requires only a small cooler. The gasified residue can be oxidized and burnt by use of exhaust gas, formed into a melted slag of minimum volume of grain-sized clinker which is completely innocuous. The remaining clinker may be disposed of without danger to the community. The clinker may be readily used for road and building construction as well as for reclamation. Consequently, dispersion of ash dust from the chimney may be reduced thereby lessening the burden of any dust collecting device. The apparatus is easy to operate and can greatly reduce cost for the use of sites and operation. All the heat required for sintering can be obtained from the refuse itself. The efficiency of heat utilization is therefore greatly increased and continuous and safe disposing is effected to secure economy.

It will thus be seen that the objects set forth above, among those made apparent from the preceding description, are efficiently attained and, since certain changes may be made in carrying out the above process and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An incinerator for the treatment of unsegregated refuse containing organic matter, comprising
   a. an injecting chamber for refuse,
   b. a rotary distributor at the bottom of said injecting chamber for even distribution of said refuse,
   c. an annular drying chamber for drying the refuse received from said rotary distributor,
   d. an annular dry distilling chamber for pretreating, heat cracking and dry distilling the refuse from the annular drying chamber,
   e. an annular oxidizing chamber including blow nozzle means for introducing a gasifying agent containing one-third to one-fourth of the quantity of air sufficient for complete combustion of said refuse,
   f. these annular chambers communicating in sequential arrangement from top downwardly so that the gas generated in these chambers rises upwardly,
   g. a gas duct having a gas collecting branch communicating with said annular drying chamber to collect and lead out from said annular chambers gases generated within same, said generated gases including corrosive and toxic components,
   h. a residue reservoir communicating with said annular oxidizing chamber and including a flame chamber having a downwardly directed, axially located first burner therein,
   i. a secondary incinerating chamber below said residue reservoir and having a second burner therein,
   j. a port connecting the bottom of said residue reservoir with said secondary incinerating chamber,
   k. a water cooling chamber communicating with the bottom of said secondary incinerating chamber,
   l. and further ducting connecting said gas duct with said first burner and said second burner, whereby, in use, said generated gases are collected by said gas duct and utilized as the heat source for said flame chamber and said secondary incinerating chamber.

2. The incinerator as defined in claim 1, further comprising means for water-cooling said oxidizing chamber.

3. The incinerator as defined in claim 1, wherein said reservoir chamber has a rotatable bottom and has means for pushing said residue in said residue reservoir chamber toward said port leading to said incineration chamber.

4. The incinerator as defined in claim 1 further comprising conduit means connected with said secondary incineration chamber for disposal of combustion gases and wherein said conduit means comprises a heat-exchanger suitable for transferring heat from said combustion products to said generated gases in said further ducting, thereby preheating said generated gases prior to combustion and increasing the efficiency of incineration by said incinerator.

5. The incinertor as defined in claim 4, further comprising boiler and preheating means for recovering sensible heat in said combustion gases leaving said conduit means, generating steam and preheating air, and ducting for leading said steam and preheated air to said blow nozzle means.

6. The incinerator as defined in claim 1 wherein said incinerator has a vent at the top thereof for allowing passage therethrough of such gases as may by-pass said gas-duct and said conduit means has an aperture for the introduction of gases, said vent and said aperture being connected by piping so that gases by-passing said gas duct leave said incinerator through said conduit means, and said conduit means includes a heat-exchanger through which the sensible heat in said combustion gases and gases from said vent may be retrieved.

7. The incinerator as defined in claim 1 wherein said rotary distributor is a rotatable frustocone with vertical axis and the smaller end facing upward.

8. The incinerator as defined in claim 1 wherein said oxidizing chamber has independently rotatable inner and outer walls.

9. A method of treatment of unsegregated refuse containing a substantial portion of organic matter, comprising the steps of introducing said refuse into an incinerator through a port proximate the top thereof, passing said refuse in downward direction sequentially over a rotary distributor, thence through an annular dry-distillation chamber, thence through an annular oxidizing chamber below said dry-distillation chamber, introducing steam and hot air into said oxidizing chamber where the quantity of air introduced is from one-fourth to one-third that necessary for combustion of said residue, hot gases being generated in said annular chambers, passing said refuse from said oxizing chamber through a residue reservoir chamber below said oxidizing chamber, said residue reservoir chamber being supplied with hot gaseous combustion products which bring about partial melting of said refuse to a residue, passing said partially molten residue through a port into an incineration chamber below said residue reservoir chamber, and introducing said hot gases with added air into said first and second burners to complete the combustion of said residue, thereby making the incineration of said refuse substantially self-sustaining.

10. The method of treatment as defined in claim 9, wherein the hot gases produced by combustion when leaving said incinerator are passed through a heat-exchanger so that the sensible heat in said gases may be retrieved for preheating air and combustible gases produced in the treatment of said refuse.

11. The incinerator as defined in claim 1, further comprising means intermediate said gas duct and said first and second burners for absorbing said corrosive and toxic components from said generated gases.

12. The incinerator as defined in claim 11, wherein said corrosive and toxic components are acidic and said means for absorbing said corrosive and toxic components include alkalis selected from the group consisting of CaO, NaOH and $Na_2CO_3$ in large particles and in solution.

13. The method of treatment as defined in claim 9 wherein said hot gases contain corrosive and toxic components and further comprising the step of removing said components from said hot gases prior to introduction of same into said burners.

14. The method as defined in claim 13 wherein said components are removed by reaction with a member selected from the group consisting of CaO, NaOH and $Na_2CO_3$ in solution and as large particles.

* * * * *